United States Patent [19]

Komatsu

[11] Patent Number: 5,794,129
[45] Date of Patent: Aug. 11, 1998

[54] MOBILE COMMUNICATION SYSTEM AND BASE STATION FOR USE THEREIN

[75] Inventor: Masahiro Komatsu, Tokyo, Japan

[73] Assignee: NEC Corporation, Tokyo, Japan

[21] Appl. No.: 678,996

[22] Filed: Jul. 12, 1996

[30] Foreign Application Priority Data

Jul. 14, 1995 [JP] Japan ................... 7-201399

[51] Int. Cl.$^6$ ........................................ H04B 1/00
[52] U.S. Cl. ................... 455/69; 455/522; 455/115; 455/70; 455/561
[58] Field of Search .................... 455/517, 522, 455/69, 115, 70, 103, 561, 524, 424

[56] References Cited

U.S. PATENT DOCUMENTS

| | | | |
|---|---|---|---|
| 5,333,175 | 7/1994 | Ariyavisitakul et al. | 455/69 |
| 5,345,598 | 9/1994 | Dent | 455/69 |
| 5,539,728 | 7/1996 | Gaiani et al. | 455/69 |
| 5,604,730 | 2/1997 | Tiedemann, Jr. | 455/69 |

FOREIGN PATENT DOCUMENTS 64-49336  2/1989  Japan .

*Primary Examiner*—Reinhard J. Eisenzopf
*Assistant Examiner*—Marsha D. Banks-Harold
*Attorney, Agent, or Firm*—Ostrolenk, Faber, Gerb & Soffen, LLP

[57] ABSTRACT

A transmission power control unit 14 receives from transceivers 11, 12 and 13 transmission power control signals which are sent by mobile terminals and contain information on the extent to which the transmission power level is to be raised or lowered, and calculates information on the level of transmission power at which transmission should take place on each channel, i.e. transmission power control signals P1, P2, . . . , PN. It further calculates the sum of the transmission power control signals P1, P2, . . . , PN, checks whether or not that sum surpasses a prescribed value and, if it does, corrects the transmission power control signals P1, P2, . . . , PN. The transmission power control unit 14 controls the transmission power levels of the transceivers 11, 12 and 13 according to the corrected values.

10 Claims, 4 Drawing Sheets

MOBILE COMMUNICATION SYSTEM AND BASE STATION FOR USE THEREIN

BACKGROUND OF THE INVENTION

The present invention relates to a mobile communication system, and more particularly to a control technique for transmission power of the base station to reduce interchannel interference in mobile communication systems.

In a mobile communication system, the base station transmits to a plurality of mobile terminals signals of speech, data or the like over channels which are set before the start of communication. In such a system, when a mobile terminal moves, the condition of reception of the electromagnetic wave from the base station changes.

As the reception power level of the desired wave drops, reception becomes more susceptible to interference from waves on other channels, making it probable for data from the base station to become unable to be correctly received by the mobile terminal. Therefore, the mobile terminal requests the base station to increase its transmission power to maintain the quality of reception. Or, conversely, if the level of the reception power of the desired wave from the base station increases more than necessary, the mobile terminal requests the base station to reduce its transmission power in order to prevent its desired wave from interfering with other channels. Such a transmission power control technique for the base station is disclosed, for example, in the Gazette of the Japanese Patent Laid-open No. 1989-49336.

FIG. 1 is a block diagram illustrating the mobile communication system described in that reference.

As shown in the diagram, the station is provided with a transceiver (TRNC) 11 and a transmission power control unit (PCONT) 31 for channel 1, a transceiver 12 and a transmission power control unit 32 for channel 2, and a transceiver 13 and a transmission power control unit 33 for channel N. The base station is further equipped with an antenna 15 to transmit signals from each transceiver to mobile terminals and to receive signals from the mobile terminals.

Each mobile terminal is provided with an antenna 16, a transceiver 17 for receiving signals from the base station via the antenna 16 and transmitting signals to the base station via the antenna 16, and a receiving condition detector (DET) 18 for detecting the condition of reception of the electric wave from the base station.

First will be described the operation of the mobile terminal. Signals of speech, data or the like from the base station is received by the antenna 16, and conveyed to the transceiver 17. The transceiver 17 demodulates the receive signals. The receiving condition detector 18 evaluates the condition of reception by detecting the error rate of demodulated signals, signal-to-interference ratio (SIR) of the receive signals or reception power and the like. If the detector finds the quality of the received signals low or unnecessarily high, it instructs the transceiver 17 to send to the base station a signal requesting the base station to change its transmission power. In response to this instruction, the transceiver 17 transmits a transmission power instruction signal, together with speech, data or the like to be transmitted to the base station, via the antenna 16 to the base station. This transmission power instruction signal contains information on how much the transmission power is to be increased or decreased.

Next will be described the operation of the base station. The base station, using one or more channels, transmits signals of speech, data or the like to mobile terminals. For this purpose, each of the transmission power control units 31, 32 and 33 controls transmission power on one or another channel. Signals on each channel are multiplexed and transmitted from the antenna 15.

Since the operation is all the same on any of channels 1 through N, the following description will refer to channel 1 alone. The transmission power control unit 31 for channel 1 determines how strong the power be used for transmission from the transceiver 11 for channel 1 should be according to a transmission power instruction signal C1, and gives the determined value to the transceiver 11 as transmission power control signal P1 for channel 1. However, if the determined value is above the upper limit of the range of the transmission power of the transceiver 11 for channel 1, the maximum value will be given as transmission power control signal P1. If the determined value is below the power limit of the range, the minimum value will be given as transmission power control signal P1 for channel 1.

The transceiver 11 for channel 1 transmits signals of speech, data or the like, which are desired to be sent, at a level of transmission power according to the transmission power control signal P1 for channel 1. The same operation takes place on channels 2 through N, and signals desired to be sent by electromagnetic wave are transmitted from the transmission/reception antenna 15 of the base station.

The wave emitted from the transmission/reception antenna 15 of the base station is received via the transmission/reception antenna 16 of a mobile terminal by its transceiver 17. The receiving condition detector 18 monitors the conditions of the reception power and detected signals at the transceiver 17, and generates a signal to instruct an increase or a decrease of the transmission power of the base station according to the SIR or the error rate after detection. This signal, either built into a main signal or over another independent channel specially available for the purpose, is transmitted from the mobile terminal to the base station. At the base station, the transceivers 11, 12 and 13 separate this signal and obtain transmission power instruction signals C1, C2, . . . , CN.

By prior art systems, if the SIR of one channel falls below or the error rate rises above respectively prescribed levels, control is effected so as to increase the transmission power of the base station. This invites increased interference with other radio communication apparatuses, i.e. other channels. This tendency is particularly conspicuous in code division multiplex access (CDMA) systems for mobile communication, in which many channels share the same frequency.

In consequence, at any mobile terminal suffering increased interference, the increased interfering waves invite a drop in SIR and a rise in error rate. If the SIR drops or the error rate rises above respectively prescribed levels, the mobile terminal using the channel suffering interference will be obliged to request to strengthen the base station transmission power, and may thereby increase its own interference with another channel or channels. In this way, requests for increased transmission power on the part of the base station arise from a plurality of channels, and the transmission power of the base station might reach its maximum, inviting an expanded region of interference.

SUMMARY OF THE INVENTION

According to one aspect of the present invention, there is provided a base station for use in a mobile communication system in which a base station and a plurality of mobile terminals communicate with each other over preset communication channels and the transmission power on each channel is controlled on the basis of a transmission power instruction signal transmitted from each of said plurality of mobile terminals, comprising:

- a plurality of base station side transceivers, one provided for each of said channels, each receiving signals from a corresponding mobile terminal, separating said transmission power instruction signal from receive signals, amplifying the signals to be transmitted to the mobile terminal of the corresponding channel at a level of transmission power designated by the transmission power control signal, and transmitting these signals to the corresponding mobile terminal, and
- a transmission power control unit which is supplied with transmission power instruction signals separated by said plurality of base station side transceivers, provisionally determines the transmission power levels of said plurality of transceivers on the basis of these transmission power instruction signals, corrects the provisionally determined transmission power levels according to the sum of the provisionally determined transmission power levels, and supplies values indicating the corrected transmission power levels to said plurality of base station side transceivers as said transmission power control signals.

According to another aspect of the invention, there is provided a mobile communication system in which a base station and a plurality of mobile terminals communicate with each other over preset communication channels, wherein:

each of said plurality of mobile terminals is provided with:

a receiving condition detector for assessing the quality of receive signals received from said base station over a channel set for that mobile terminal, and generating a transmission power instruction signal for requesting said base station to change its transmission power according to the assessed quality, and a mobile terminal side transceiver for receiving signals from said base station, and transmitting data to be transmitted to said base station and said transmission power instruction signal to said base station; and said base station is provided with:

a plurality of base station side receivers, one provided for each of said channels, for receiving signals from a corresponding mobile terminal, separating said transmission power instruction signal from receive signals, amplifying the signals to be transmitted to the mobile terminal of the corresponding channel at a level of transmission power designated by the transmission power control signal, and transmitting these signals to the corresponding mobile terminal, and a transmission power control unit which is supplied with transmission power instruction signals separated by said plurality of base station side transceivers, provisionally determines the transmission power levels of said plurality of transceivers on the basis of these transmission power instruction signals, corrects the provisionally determined transmission power levels according to the sum of the provisionally determined transmission power levels, and supplies values indicating the corrected transmission power levels to said plurality of base station side transceivers as said transmission power control signals.

DESCRIPTION OF THE PREFERRED EMBODIMENT

Figure 1:
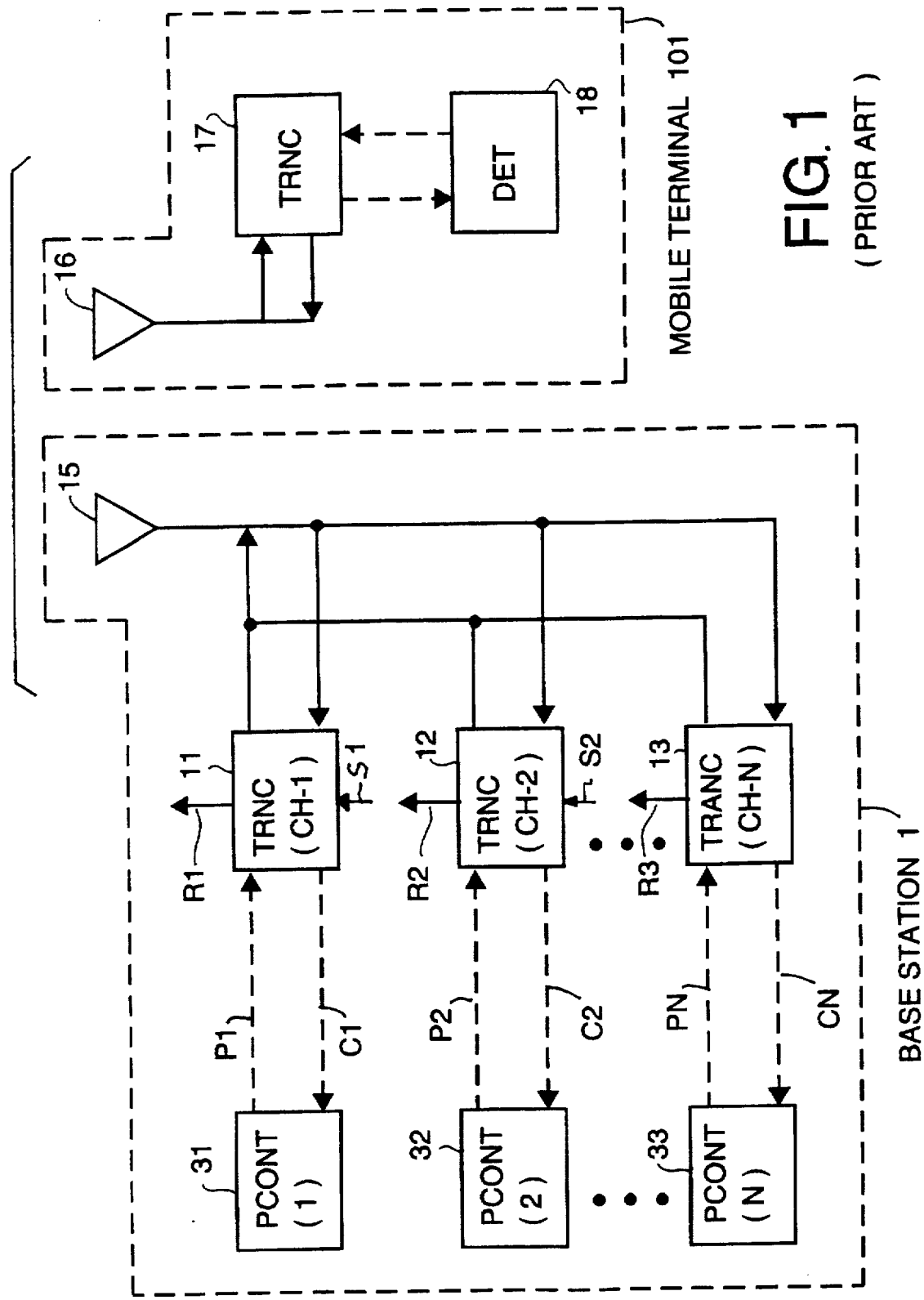
FIG. 1 is a block diagram for describing a mobile communication system according to the prior art.
Figure 2:
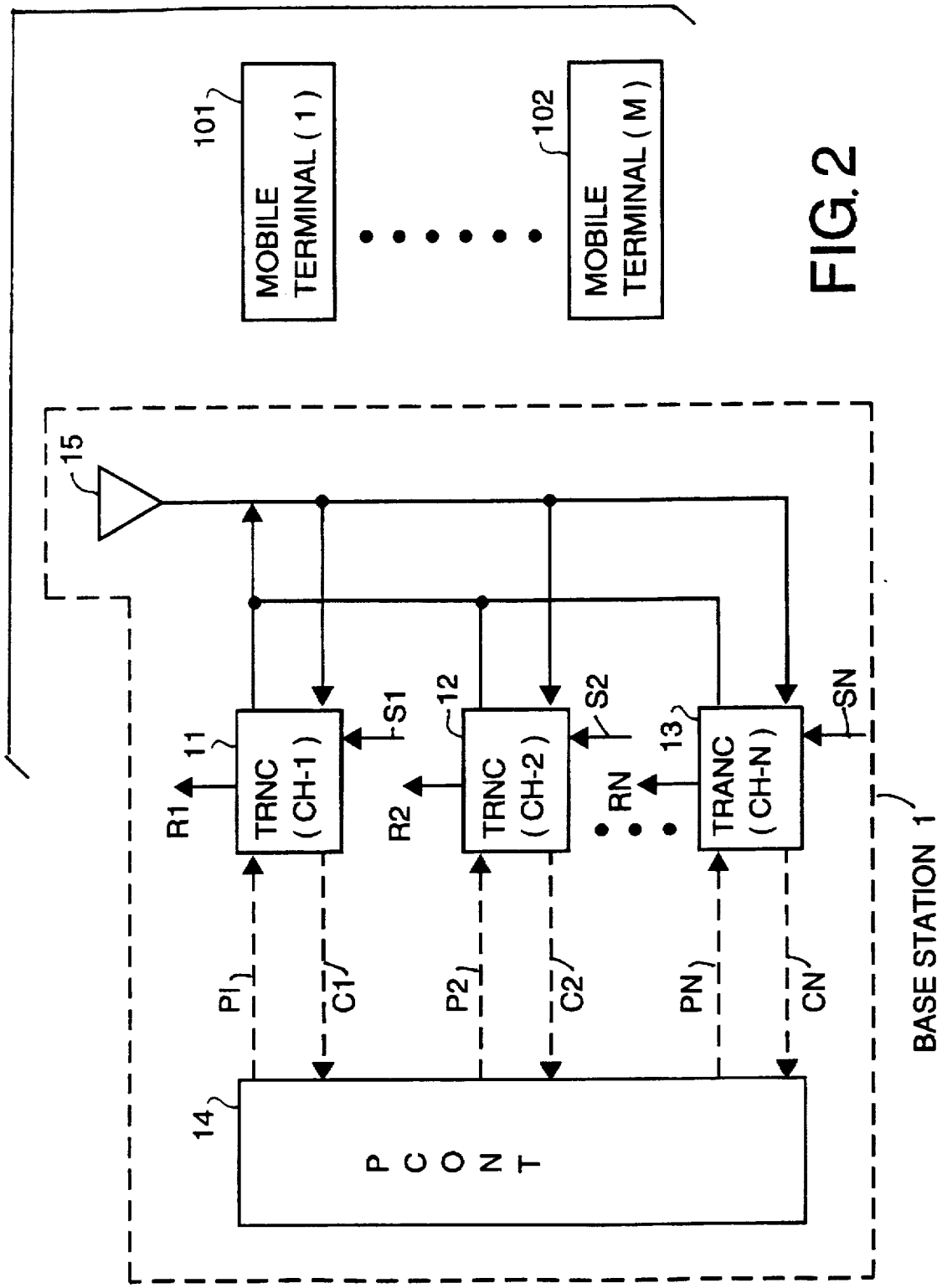
FIG. 2 is a block diagram for describing the principle of the present invention

FIG. 2 is a block diagram for describing the principle of the present invention. As comparison of FIGS. 1 and 2 would clearly reveal, a difference between the invention and the prior art consists in that a single transmission power control unit 14 replaces the transmission power control units 31, 32 and 33, each provided for one or another of the transceivers 11, 12 and 13 according to the prior art, and this transmission power control unit 14 can collectively control transmission power levels on all the channels. Other differences between the invention and the prior art will become evident with the progress of description.

First will be described operations related to the transceiver 11 for channel 1. Upon receiving signals via the antenna 15 from a mobile station to which channel 1 is assigned, the transceiver 11 for channel 1 demodulates the receive signals, separates them into signals R1 indicating speech, data or the like and a transmission power instruction signal C1, and delivers the latter to the transmission power control unit (PCONT) 14. This transmission power instruction signal C1 includes instruction information from the mobile station regarding how much the base station should raise or lower its transmission power level.

First, the transmission power control unit 14 provisionally determines in accordance with the transmission power instruction signal C1 at what transmission power level transmission to the transceiver 11 for channel 1 should be set. However, if this provisionally determined level is above the upper limit, or below the lower limit, of a preset transmission power range, it provisionally chooses the upper or lower limit, whichever applies, as transmission power control signal P1. The procedure up to this point is the same for channels 2 through N, too.

Next, if the sum of the provisionally determined transmission power levels of every channels surpasses a prescribed level, the transmission power control unit 14 will correct the provisionally determined power levels. For instance, it will reduce the transmission power levels on channels 1 through N evenly or the transmission output on each channel according to its provisionally determined level. In this way, transmission power control signals P1, P2, . . . , PN are determined.

The transceiver 11 for channel 1 transmits to a mobile terminal to which channel 1 is assigned signals of speech, data or the like to be transmitted at a transmission power level according to the transmission power control signal P1 for channel 1. The same procedure is taken for channels 2 through N, and signals to be transmitted are transmitted by electromagnetic wave from the base station's transmission/reception antenna 15 to the corresponding mobile terminals.

The waves emitted from the base station's transmission/reception antenna 15 are received by the respective mobile terminals. The operations of the mobile terminals will be described later.

In this manner, the transmission power on the transmitting side is prevented from rising excessively, and the range of interference is thereby compressed.

Figure 3:
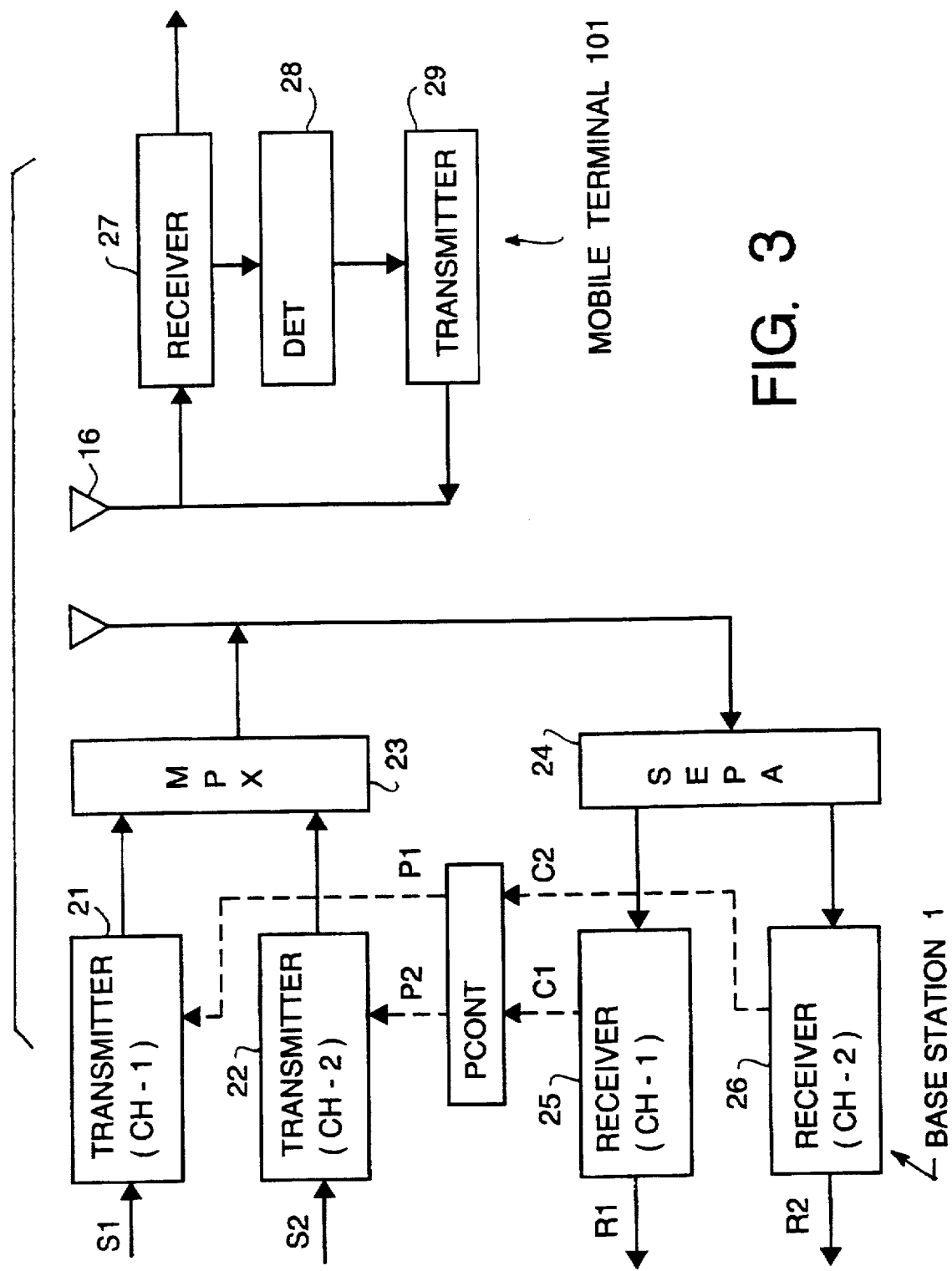
FIG. 3 is a block diagram illustrating the configuration of a base station according to the invention.

FIG. 3 is a block diagram illustrating a typical configuration of the base station and the mobile terminal in FIG. 2. In the diagram, reference sign 14 denotes a transmission power control unit; 15, a base station transmission/reception antenna; 16, a mobile terminal transmission/reception antenna; 21, a transmitter for channel 1; 22, a transmitter for channel 2; 23; a multiplexer; 24, a separator; 25, a receiver for channel 1; 26, a receiver for channel 2; 27, a mobile terminal receiver; 28, a receiving condition detector; 29, a mobile terminal transmitter; C1, a transmission power control signal for channel 1; C2, a transmission power control signal for channel 2, P1, a transmission power instruction signal for channel 1; and P2, a transmission power instruction signal for channel 2. The transmission power control unit 14 may be a computer including a CPU, a memory and the like, and its operation is realized by a computer program.

The base station in this embodiment has a maximum of N radio channels. The base station transmits signals of speech, data or the like over one or more of these N radio channels. When carrying out transmission, it performs transmission power control and multiplexes the channels to transmit signals via its antenna.

Figure 4:
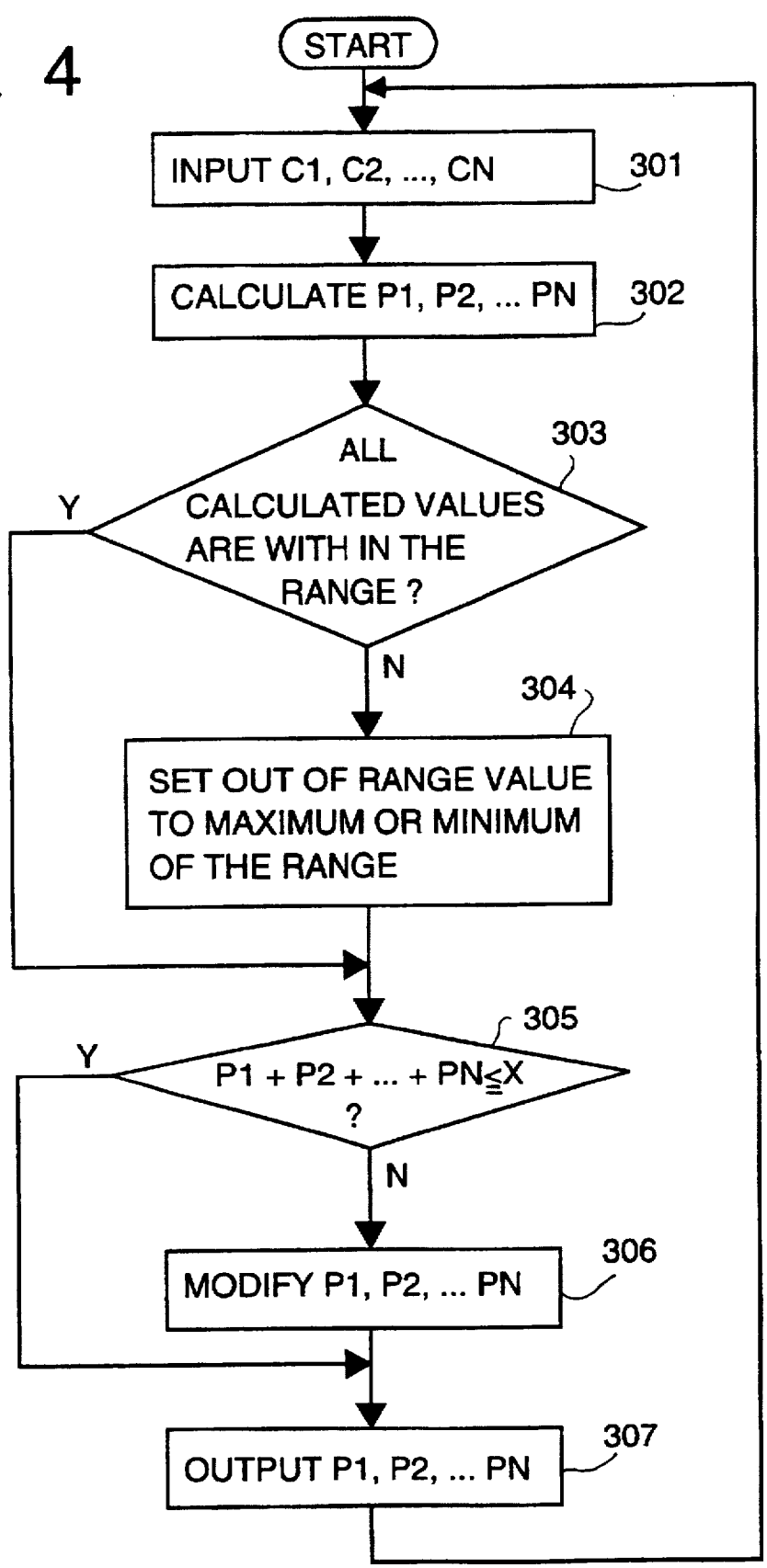
FIG. 4 is flow chart for describing the operation of the transmission power control unit 14 of FIG. 3.

The operation of transmission power control unit 14 will now be described with reference to the flow chart of FIG. 4. The transmission power control unit 14, at step 301, receives channel receiver transmission power instruction signals C1, C2, . . . , CN containing requests from mobile terminals regarding how much its transmission power level should be raised or lowered. Then, at step 302, information on the levels of transmission power at which transmission should take place on the different channels, i.e. the provisional values for transmission power control signals P1, P2, . . . , PN, are calculated and provisionally determined. If, for instance the content of the transmission power control signal C1 is a request to raise the transmission power of the transmitter for channel 1 by 1 dB, the provisionally determined value P1 for the channel 1 transmission power control signal P1 will be made 1 dB higher than the current level of transmission power of channel 1.

Then, at step 303, it is checked whether or not the values P1, P2, . . . , PN provisionally determined at step 302 are within the transmission power ranges of the respective channels, and those above the upper limit of the range are changed to the upper limit while those below the lower limit are changed to the lower limit (step 304).

Next, the sum of the values P1, P2, . . . , PN provisionally determined at either step 303 or step 304 is calculated, and checked whether or not the sum surpasses a prescribed value X (step 305). If it does, the values P1, P2, . . . , PN will be corrected at step 306.

If, for instance, the sum of the transmission power levels from channels 1 through N surpasses the prescribed value X, either the provisional values of all the channels from 1 through N, or those of only the channels relatively high in transmission power level, are reduced by 1 dB each, or the provisionally determined values are changed to lower levels in proportion to the initial provisional values.

The prescribed value X may be determined according to the size of the base station's cell and the number of mobile terminals among other factors. This prescribed value X may further be made variable according to the state of interference.

At step 307, the transmission power control signals P1, P2, . . . , PN determined as described above are supplied to the transmitters for the respective channels. The transceiver for each channel transmits signals of speech, data or the like to be transmitted at the level of transmission power conforming to the applicable one of the transmission power control signals P1, P2, . . . , PN. The multiplexer 23 multiplexes the signals from the different channels, and transmits them by electric wave from the base station's transmission/reception antenna 15.

The electro-magnetic wave emitted from the base station's transmission/reception antenna 15 is received by the receiver 27 of one or another of the mobile terminals via its transmission/reception antenna 16. The receiving condition detector 28 monitors the conditions of receive power and detected signals at the receiver 27, and generates a signal to instruct the base station's transmission power to be raised or lowered according to one or more of SIR, post-detection bit error rate and frame error rate.

For example, thresholds A, B and C (A>B>C) are set, and a signal is generated which instructs to lower the transmission power of the base station by 1.0 dB if SIR surpasses A, to reduce it by 0.5 dB if the SIR surpasses B but not A, to raise it by 0.5 dB if SIR surpasses C but not B, or to raise it by 1.0 dB if SIR fails to surpass C.

This signal is transmitted, either incorporated into the main signals or over another special independent channel, from the transmitter 29 of the mobile terminal to the base station. At the base station, the separator 24 separates the signals channel by channel, and the receiver 25 separates these signals to make them transmission power instructing signals C1, C2, . . . , CN.

The invention serves to prevent the transmission power of the transmitter from rising too high, and makes communication possible at the lowest necessary transmission power level, resulting in compression of the interference range.

What is claimed is:

1. A base station for use in a mobile communication system in which a base station and a plurality of mobile terminals communicate with each other over preset communication channels and the transmission power on each channel is controlled on the basis of a transmission power instruction signal transmitted from each of said plurality of mobile terminals, comprising:

a plurality of base station side transceivers, one provided for each of said channels, each receiving signals from a corresponding mobile terminal, separating said transmission power instruction signal from receive signals, amplifying the signals to be transmitted to the mobile terminal of the corresponding channel at a level of transmission power designated by the transmission power control signal, and transmitting these signals to the corresponding mobile terminal, and a transmission power control unit which is supplied with transmission power instruction signals separated by said plurality of base station side transceivers, provisionally determines the transmission power levels of said plurality of transceivers on the basis of these transmission power instruction signals, corrects the provisionally determined transmission power levels according to the sum of the provisionally determined transmission power levels, and supplies values indicating the corrected transmission power levels to said plurality of base station side transceivers as said transmission power control signals.

2. A base station for use in a mobile communication system, as claimed in claim 1, wherein said transmission power control unit, if said sum surpasses a predetermined value, corrects the provisionally determined transmission power value of any of said plurality of channels which is relatively high to a lower value and supplies this lower value as said transmission power control signal for that channel; supplies the provisionally determined transmission power values for all other channels to the corresponding ones of said base station side transceivers as said transmission power control signals; or if said sum does not surpass the predetermined value, supplies the provisionally determined transmission power values for said plurality of channels to the corresponding ones of said base station side transceivers as said transmission power control signals.

3. A base station for use in a mobile communication system, as claimed in claim 2, wherein said transmission power control unit, if there is any value outside the range prescribed for each channel among the transmission power values provisionally determined on the basis of transmission power instruction signals for the respective channels, changes that provisionally determined value which is out of said range to a value within said range.

4. A base station for use in a mobile communication system, as claimed in claim 1, wherein said transmission power control unit, if said sum surpasses a predetermined value, corrects said provisionally determined transmission power values according to the difference between said sum and said predetermined value and supplies the corrected values as said transmission power control signals to the corresponding ones of said base station side transceivers, or if said sum does not surpass the predetermined value, supplies the provisionally determined transmission power values for said plurality of channels to the corresponding ones of said base station side transceivers as said transmission power control signals.

5. A base station for use in a mobile communication system, as claimed in claim 4, wherein said transmission power control unit, if there is any value outside the range prescribed for each channel among the transmission power values provisionally determined on the basis of transmission power instruction signals for the respective channels, changes that provisionally determined value which is out of said range to a value within said range.

6. A mobile communication system in which a base station and a plurality of mobile terminals communicate with each other over preset communication channels, wherein:

each of said plurality of mobile terminals is provided with:

a receiving condition detector for assessing the quality of receive signals received from said base station over a channel set for that mobile terminal, and generating a transmission power instruction signal for requesting said base station to change its transmission power according to the assessed quality, and a mobile terminal side transceiver for receiving signals from said base station, and transmitting data to be transmitted to said base station and said transmission power instruction signal to said base station; and said base station is provided with:

a plurality of base station side receivers, one provided for each of said channels, for receiving signals from a corresponding mobile terminal, separating said transmission power instruction signal from receive signals, amplifying the signals to be transmitted to the mobile terminal of the corresponding channel at a level of transmission power designated by the transmission power control signal, and transmitting these signals to the corresponding mobile terminal, and a transmission power control unit which is supplied with transmission power instruction signals separated by said plurality of base station side transceivers, provisionally determines the transmission power levels of said plurality of transceivers on the basis of these transmission power instruction signals, corrects the provisionally determined transmission power levels according to the sum of the provisionally determined transmission power levels, and supplies values indicating the corrected transmission power levels to said plurality of base station side transceivers as said transmission power control signals.

7. A mobile communication system, as claimed in claim 6, wherein said transmission power control unit, if said sum surpasses a predetermined value, corrects the provisionally determined transmission power value of any of said plurality of channels which is relatively high to a lower value and supplies this lower value as said transmission power control signal for that channel; supplies the provisionally determined transmission power values for all other channels to the corresponding ones of said base station side transceivers as said transmission power control signals; or if said sum does not surpass the predetermined value, supplies the provisionally determined transmission power values for said plurality of channels to the corresponding ones of said base station side transceivers as said transmission power control signals.

8. A mobile communication system, as claimed in claim 7, wherein said transmission power control unit, if there is any value outside the range prescribed for each channel, among the transmission power values provisionally determined on the basis of transmission power instruction signals for the respective channels, changes that provisionally determined value which is out of said range to a value within said range.

9. A mobile communication system, as claimed in claim 6, wherein said transmission power control unit, if said sum surpasses a predetermined value, corrects said provisionally determined transmission power values according to the difference between said sum and said predetermined value and supplies the corrected values as said transmission power control signals to the corresponding ones of said base station side transceivers, or if said sum does not surpass the predetermined value, supplies the provisionally determined transmission power values for said plurality of channels to the corresponding ones of said base station side transceivers as said transmission power control signal.

10. A mobile communication system, as claimed in claim 9, wherein said transmission power control unit, if there is any value outside the range prescribed for each channel among the transmission power values provisionally determined on the basis of transmission power instruction signals for the respective channels, changes that provisionally determined value which is out of said range to a value within said range.

\* \* \* \* \*